United States Patent
Talanis et al.

(10) Patent No.: US 7,287,080 B2
(45) Date of Patent: Oct. 23, 2007

(54) SYSTEM AND METHOD FOR TRANSMITTING DATA VIA DATA NETWORKS, PARTICULARLY THE INTERNET, USING AN ASYNCHRONOUS DATA CONNECTION

(75) Inventors: Thomas Talanis, Heroldsbach (DE); Frank Volkmann, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 684 days.

(21) Appl. No.: 10/343,708

(22) PCT Filed: Jul. 27, 2001

(86) PCT No.: PCT/DE01/02851

§ 371 (c)(1),
(2), (4) Date: Feb. 3, 2003

(87) PCT Pub. No.: WO02/13480

PCT Pub. Date: Feb. 14, 2002

(65) Prior Publication Data

US 2003/0172080 A1  Sep. 11, 2003

(30) Foreign Application Priority Data

Aug. 3, 2000 (DE) ................................ 100 38 557

(51) Int. Cl.
*G06F 15/16* (2006.01)
(52) U.S. Cl. .................. 709/227; 709/203; 709/205; 709/224; 709/234
(58) Field of Classification Search ................ 709/203, 709/205, 227, 224, 234
See application file for complete search history.

(56) References Cited

U.S. PATENT DOCUMENTS 5,553,239 A * 9/1996 Heath et al. ................... 726/2

(Continued)

FOREIGN PATENT DOCUMENTS

JP  9-247212  9/1997

(Continued)

OTHER PUBLICATIONS

Wolf: "Experiences with HTTP-SELECT and Asynchronous Updates", Internet draft, Jun. 1999, pp. 1-11.

(Continued)

*Primary Examiner*—Michael Won
(74) *Attorney, Agent, or Firm*—Staas & Halsey LLP

(57) ABSTRACT

To provide a bi-directional data connection via the Internet, even across firewalls and starting from a client which is not visible as a server on the Internet, a first connection request for establishing a first transmission channel is sent from a first data processing device of a client via a data connection to a server of an automation system. The server responds to the request using a second transmission channel. The data connection is thus kept open permanently, allowing data to be sent and received bi-directionally. The operations between the client and the server are temporally independent of each other by at least one data network, in particular, the Internet. To guarantee a temporally unlimited service life of a data connection, dummy data is transmitted, for example, at regular intervals from the server to the client, even if no useful data is present, to maintain at least one data connection.

19 Claims, 2 Drawing Sheets

U.S. PATENT DOCUMENTS

Figure 1:
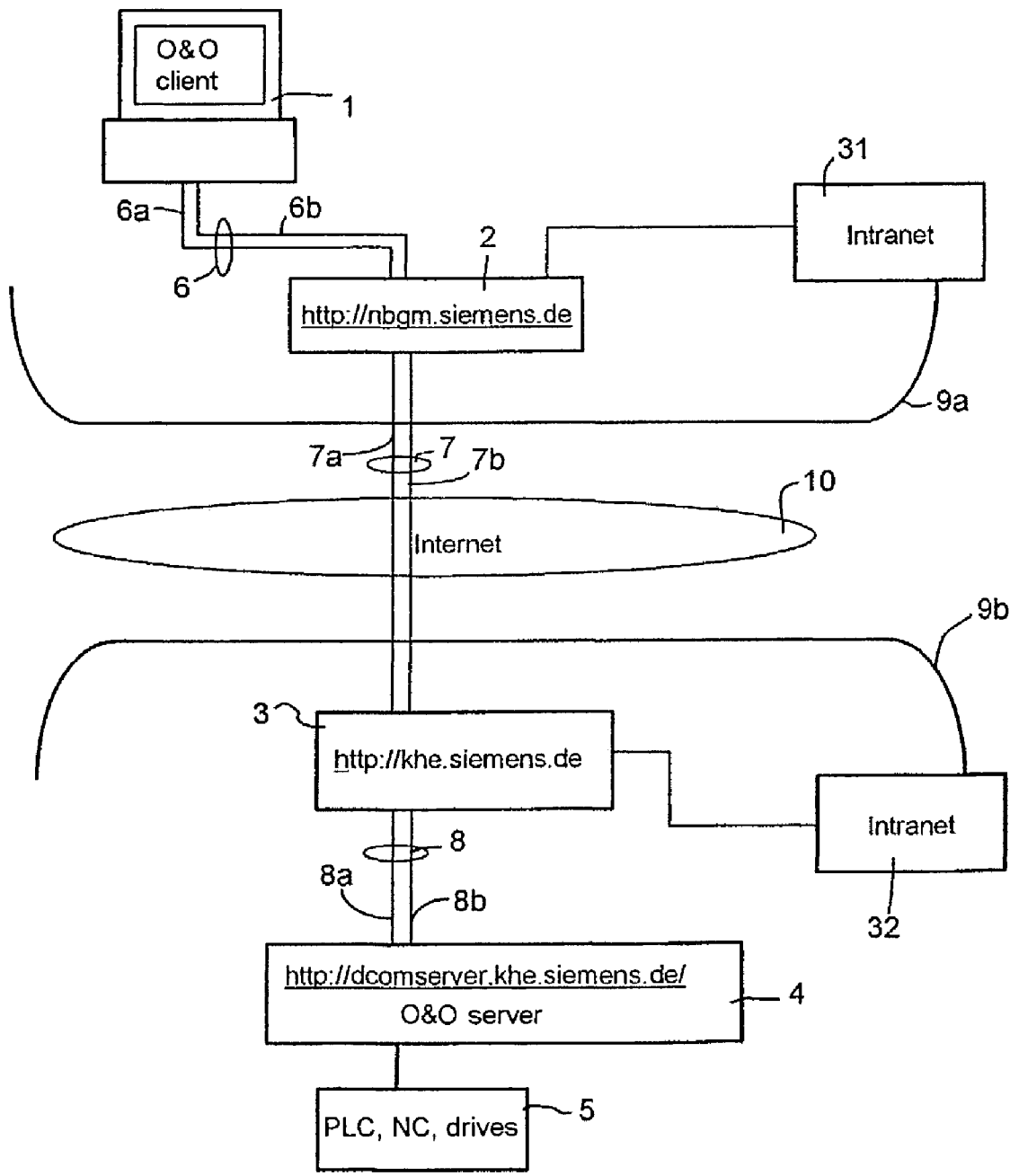

| | | | |
|---|---|---|---|
| 5,687,167 A * | 11/1997 | Bertin et al. | 370/254 |
| 5,790,806 A * | 8/1998 | Koperda | 709/252 |
| 5,852,717 A * | 12/1998 | Bhide et al. | 709/203 |
| 5,898,668 A * | 4/1999 | Shaffer | 370/230 |
| 5,980,090 A * | 11/1999 | Royal et al. | 700/241 |
| 6,020,884 A | 2/2000 | MacNaughton et al. | |
| 6,173,322 B1 * | 1/2001 | Hu | 709/224 |
| 6,272,675 B1 * | 8/2001 | Schrab et al. | 717/100 |
| 6,286,052 B1 * | 9/2001 | McCloghrie et al. | 709/238 |
| 6,321,250 B1 * | 11/2001 | Knape et al. | 709/203 |
| 6,341,312 B1 * | 1/2002 | French et al. | 709/227 |
| 6,394,341 B1 * | 5/2002 | Makipaa et al. | 235/379 |
| 6,412,009 B1 * | 6/2002 | Erickson et al. | 709/228 |
| 6,418,128 B1 * | 7/2002 | Takagi et al. | 370/328 |
| 6,526,434 B1 * | 2/2003 | Carlson et al. | 709/203 |
| 6,711,621 B1 * | 3/2004 | Mitra et al. | 709/230 |
| 6,724,881 B1 * | 4/2004 | McAllister et al. | 379/220.01 |
| 6,754,621 B1 * | 6/2004 | Cunningham et al. | 704/219 |
| 6,789,119 B1 * | 9/2004 | Zhu et al. | 709/227 |
| 6,865,188 B1 * | 3/2005 | Stirling et al. | 370/460 |
| 6,865,599 B2 * | 3/2005 | Zhang | 709/218 |
| 6,944,584 B1 * | 9/2005 | Tenney et al. | 703/22 |
| 6,988,140 B2 * | 1/2006 | Chintalapati et al. | 709/227 |
| 7,010,002 B2 * | 3/2006 | Chow et al. | 370/485 |
| 7,020,098 B2 * | 3/2006 | Ehrsam et al. | 370/260 |
| 2004/0073680 A1 * | 4/2004 | Bauer et al. | 709/227 |

FOREIGN PATENT DOCUMENTS

| | | |
|---|---|---|
| WO | 98/50982 | 11/1998 |

OTHER PUBLICATIONS

Martin-Flatin, et al: "JAMAP: a Web-Based Management Platform for IP Networks", Active Technologies for Network and Service Management, 10th IFIP/IEEE Internet. Workshop on Distributed Systems: Operations and Management, DSOM'99, Proceedings (Lecture Notes in Computer Science vol. 1700), Active Technologies for Network and SE, pp. 164-178.

Spreitzer et al: "HTTP Next Generation", Ninth Internet. World Wide Web Conference, Amsterdam, Netherlands, May 15-19, 2000, vol. 22, No. 1-6, pp. 593-607.

Mosedale, et al: "Administering Very High Volume Internet Services", Proceedings of the Ninth Systems Administration Conference (LISA IX), Proceedings of 9th Usenix Systems Administration Conference, Monterey, CA, USA, Sep. 17-22, 1995, pp. 95-102.

"An Exploration of Dynamic Documents", Netscape Assistance, 1995, 6 pp.

Cohen, et al. "Managing TCP connections under persistent HTP", Proceedings of the Eight Internet World Wide Conference, Toronto Ont., Canada, May 11-14, 1999, vol. 31, No. 11-16, pp. 1709-1723.

Khare: "Building the Perfect Beast: Dreams of a Grand Unified Protocol", IEEE Internet Computing, Mar.-Apr. 1999, IEEE, USA, vol. 3, No. 2, pp. 89-93.

Japanese Office Action—Notification of Reason for Rejection—Japanese Application No. P-21942; mailed Aug. 17, 2006.

* cited by examiner

SYSTEM AND METHOD FOR TRANSMITTING DATA VIA DATA NETWORKS, PARTICULARLY THE INTERNET, USING AN ASYNCHRONOUS DATA CONNECTION

The invention relates to a system and a method for transmitting data via data networks, particularly the Internet, using an asynchronous data link.

With the aid of data networks, any computers, "clients", which have access to these data networks can be used to set up a data link to a server. This applies particularly to the worldwide web (WWW), which is also referred to as the Internet. The terms web or Internet server and web or Internet client used below serve to illustrate the association with the specific data network the Internet, but their operation does not differ from the meaning of the terms client and server which are used for all possible data networks.

On the Internet, a data link is set up to a "web server" or "Internet server". An Internet server is accessed, by way of example, using known Internet browsers, e.g. Internet Explorer from the company Microsoft or Netscape Communicator from the company Netscape. When setting up a data link from a "web client" or "Internet client", a request is sent to an Internet server by entering and sending a "URL address". When a data link has been set up, the Internet server called responds with an "HTML page" (HTML=Hyper Text Markup Language), also called a web page. The "web clients" communicate with the web servers using transport protocols. Every data link between web client and web server is thus based on a request protocol and, in response thereto, on a response protocol.

The invention is based on the object of specifying a system and a method for transmitting data via data networks, particularly the Internet, which system and method allow temporally independent, bidirectional transmission of data even between two data processing apparatuses which can be linked to data networks, particularly the Internet, and even behind data protection devices, particularly firewalls, even if one of the two data processing apparatuses is not visible on the data network, particularly the Internet.

This object is achieved by a method for transmitting data via data networks, particularly the Internet, in which a client is used to send a first connection request for setting up at least one first transmission channel to a server via a data link, where at least one data link, particularly a transmission channel, is permanently open which is provided for sending data from the server to the client via at least one data network at any time independently of actions by the client.

This object is achieved by a system for transmitting data via data networks, particularly the Internet, having at least one data processing apparatus, which can be linked to a data network, particularly the Internet, on a client, where the first data processing apparatus is provided for setting up at least one data link in the form of a first transmission channel to a server, with at least one data link, particularly a transmission channel, being permanently open which is provided for sending data from the server to the client via at least one data network at any time independently of actions by the client.

The invention is based on the insight that the Internet cannot be used for a genuine "active" data link to a client which is not visible on the Internet, but rather permits only a data link between any client connected to the Internet and any server which is visible on the Internet. This drawback is eliminated surprisingly easily by virtue of the client first being used to set up a first transmission channel to the Internet server in an automation system. To this end, the client, which can be used as a fully functional operating and observation system in the automation system following setup of the bidirectional data links, is used to send a first connection request to the Internet server in the automation system. The Internet server responds to this connection request and, in order to keep this data link permanently open, the Internet server transmits dummy data, for example even in the absence of user data, to the client or transmits information to the client which notifies the client that transmission of user data is also intended. In this case, dummy data are data which are generated by the server itself and are sent to the client for the purpose of maintaining the data link.

This installs a permanently open data link which the Internet server and hence the automation system can use to send data to the client and hence to the O&O system asynchronously at any time and independently of actions by the client.

Independently thereof and in parallel therewith, the client and the Internet server can also communicate with one another conventionally on the Internet by virtue of the client respectively directing a new request to the Internet server, which the latter responds to using an appropriate response.

A system of mutually independent data links is thus available which both the client, that is to say the O&O system, and the automation system can independently use to communicate with one another. Between client and server, or in other words between operating and observation system and automation system, the functions of a bidirectional data link are ensured, which data link also permits, in particular, data transmission from the server to the client, since the server is constantly connected to the client via a permanently open transmission channel, which means that bidirectional data transmission between client and server is possible in both directions at independent times. Such a data link is particularly suitable for operating and observing an automation system, where the client can function as an operating and observation system which can be activated from any computer connected to the Internet. In contrast to conventional Internet data links, this results in an asynchronous data transmission method which does not require the client to be visible on the Internet or to have installed a "web server" (IIS=Internet Information Server). This makes it possible to set up a bidirectional data link to a server from any location in the world, in front of and behind data protection devices, particularly firewalls. Since the data link is activated from the client, i.e. from the O&O system, it is not necessary for the server itself to actively set up a data link to the client. In addition, it is also not necessary to change the configuration of the client.

Permanent maintenance of a data link can be ensured by virtue of dummy data being transmitted, even in the absence of user data, in order to maintain at least one transmission channel.

One particularly advantageous refinement of the invention is characterized in that the dummy data are sent from the server to the client. In this case, it has been found to be particularly advantageous for dummy data to be transmitted from the server to the client every 25-30 seconds in the absence of user data, in order to keep the data link open.

Another advantageous refinement of the invention is characterized in that a permanent data link, particularly a transmission channel, is maintained between server and client by virtue of the server sending the client information which notifies the client that transmission of data is intended.

Another advantageous refinement of the invention is characterized in that a data link, particularly a transmission channel between server and client, which the server uses to transmit volumes of data up to a stipulated size is permanently maintained by virtue of the server sending a request for a new connection request to the client before the stipulated volume of data is reached, and the client then sending a new connection request for setting up at least one new transmission channel to the server. A size of 15-25 MB for the volume of data to be transmitted via a transmission channel has been found to be very advantageous, since this improves the performance or the response times of the system on account of communication across firewall computers to an extraordinary extent, and hence the cost/benefit ratio is at its most effective.

Another advantageous refinement of the invention is characterized in that a transport protocol, particularly an Internet transport protocol, is provided for controlling the data transmission. In this regard, the use of the hypertext transport protocol (HTTP) as the transport protocol has been found to be particularly advantageous, since application thereof is extraordinarily simple and the adjustment complexity is very low.

One particularly advantageous application of the invention, using available infrastructures, particularly Internet infrastructures for bidirectional data transmission, involves the method for operating and observing an automation system, for example, being provided via at least one data network, particularly via the Internet, since this allows very simple implementation of remote diagnosis, for example, as a result of which any faults arising can be inexpensively analyzed and eliminated in the course of ongoing operation of automation systems, for example, at locations which are at a great physical distance from one another.

Another advantageous refinement of the invention is characterized in that the client does not need to be visible on the Internet or to have installed an Internet information server (IIS).

Connection of the automation and communication technology can easily be designed such that the operating and observation system on the client initiates the provision of at least one transmission channel as a distributed object, particularly as a DCOM object, and that connection setup to the automation system is effected via a DCOM server.

Figure 2:
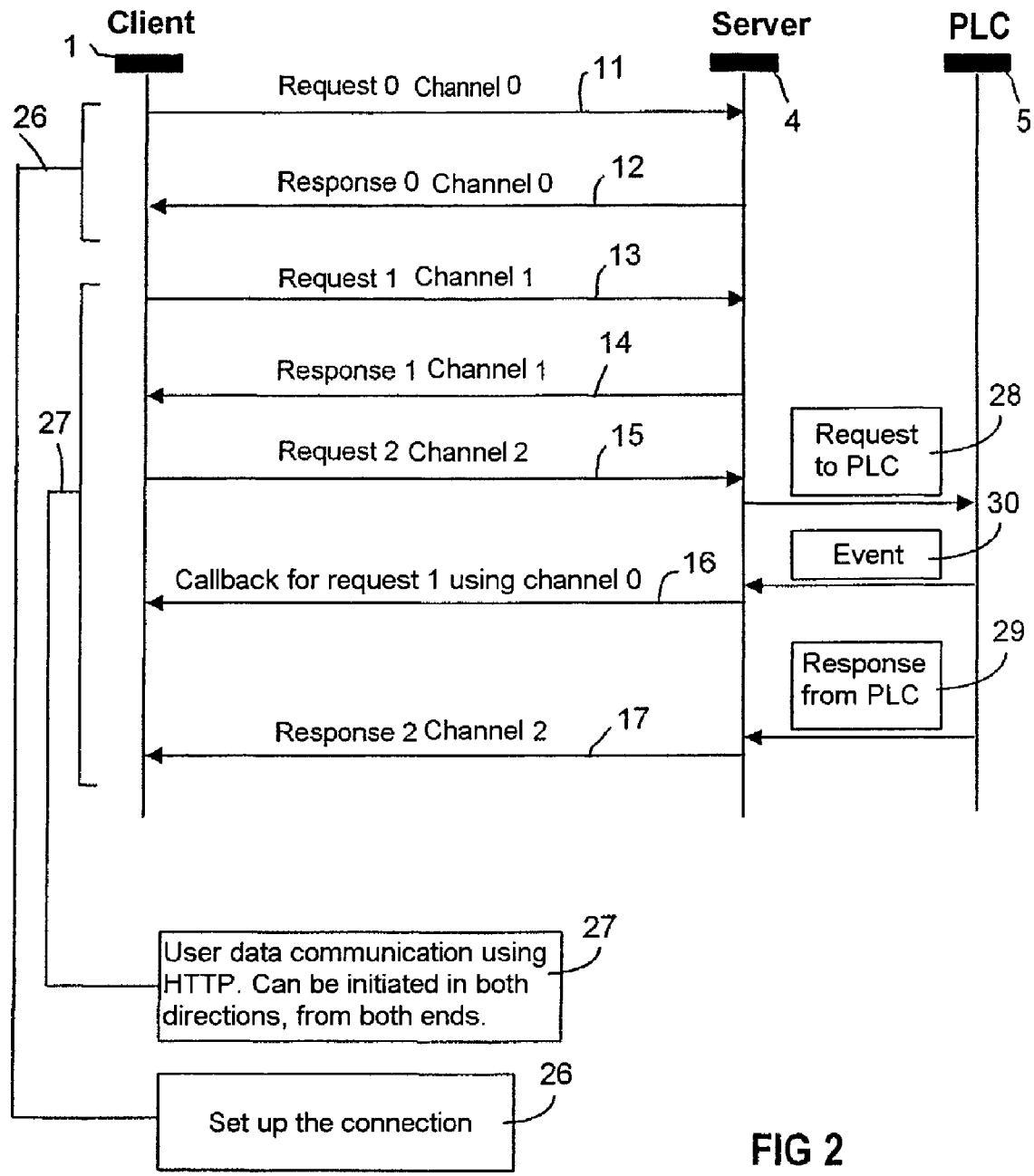

The invention is described and explained in more detail below with reference to the exemplary embodiments illustrated in the figures, in which:

FIG. 1 shows a block diagram of an exemplary embodiment of an automation system having an Internet link for operation and observation, and FIG. 2 shows a schematic timing diagram for possible user data communication between client and automation system.

FIG. 1 shows an exemplary embodiment of a system for operating and observing automation systems 5 which have, by way of example, programmable logic controllers (PLCs), numerical controllers (NC) and/or drives. The system features an operating and observation system 1 (O&O client) which is linked to a firewall computer 2 via an internal data network 6, e.g. an Ethernet. The operating and observation system 1, also referred to below as O&O system 1 for short, has an associated local intranet address which does not need to be known on the Internet. The line 9a in FIG. 1 is used to indicate the firewall on the firewall computer 2, which surrounds the internal communication network 31 (=intranet 31) of the firewall server 2. The reference 10 identifies the worldwide data communication network the Internet. The firewall computer 2 can be linked to the Internet 10 by means of a connecting line 7, e.g. ISDN. The automation system 5 can be linked to the Internet 10 via an Internet server 4, which is used as an O&O server 4 for the automation system 5 and has the Internet address dcom-server.khe.siemens.de/, for example, via a connecting line 8 and via a respective second firewall computer 3. The second firewall 9b surrounds the intranet 32 associated with the firewall computer 3. The firewall computer 3 is visible on the Internet 10 at the Internet address khe.siemens.de, for example.

For the purpose of better illustration and explanation of the respective transmission direction for communication between client 1 and server 4 and vice versa, the data link 6, 7, 8 between the client 1 and the server 4 is shown in the form of two subchannels in FIG. 1. These subchannels contain a first transmission channel 6a, 7a, 8a, which symbolizes the communication direction from the client 1 to the server 4, and a second transmission channel 6b, 7b, 8b, which symbolizes the communication direction from the server 4 to the client 1. Physically, the two subchannels shown are a single transmission channel, i.e. the same physical transmission channel is used for a response from the server 4 to an associated request from the client 1 to the server 4.

The text below will use connection setup between the client 1 and the O&O server 4 as an example to explain the setup of a bi-directional transmission and reception connection between the client 1 and the O&O server 4 via the Internet 10 at mutually independent times. For this, an asynchronous method is used which allows the O&O server 4 to send data to the client 1, independently of actions by the client 1, which itself does not need to be visible on the Internet 10, i.e. does not have its own valid Internet address. To this end, the client 1 sends a first request via the Internet 10 to the O&O server 4 using the first transmission channel 6a, 7a, 8a, whereupon the O&O server 4 reacts with a response via the second transmission channel 6b, 7b, 8b. To prevent the response from being interrupted over time, and hence to prevent the data links 6, 7, 8 from being disconnected, the duration of the response is stretched to be of "infinite" length. To this end, the system is notified, by way of example, that other data also need to be sent. This results in a permanently open data link 6, 7, 8 which the O&O server 4 and hence the automation system 5 can use to send data to the client 1 and hence to the O&O system 1 asynchronously at any time and independently of actions by the client 1. To keep the data link 6, 7, 8 permanently open, it is also possible, by way of example, to send dummy data from the server 4 to the client 1 at regular intervals, advantageously every 25-35 seconds.

Independently of this permanently open data link 6, 7, 8, "normal" communication can also take place between the client 1 and the O&O server 4 via the Internet 10, i.e. the client 1 sends a request to the O&O server 4 using a new transmission channel, and the O&O server 4 responds to this request with a corresponding response using this transmission channel. When the data have been transmitted, the new transmission channel is closed again. The client 1 and the O&O server 4 can thus send and receive data bidirectionally at mutually independent times.

To control the data transmission, a transport protocol, particularly an Internet transport protocol, is used. Advantageously, the hypertext transport protocol (HTTP) is used as the transport protocol in this regard.

FIG. 2 shows the timing for setting up 26 a permanently open data link 6, 7, 8 between a client 1 and an O&O server 4 to which an automation system 5, referred to by way of example as a PLC (=Programmable Logic Controller), is connected. The illustration uses UML (Unified Modelling Language) notation. In addition, FIG. 2 shows the bidirectional communication which can be initiated by the client 1 and the O&O server 4 at mutually independent times after the data link has been set up. The timing for setting up the data link is as follows: the client 1 sends a request 11 to the server 4, which responds thereto with a response 12, this data link not being cleared down. In this regard, the client 1 is notified, by way of example, that other data also need to be sent, as a result of which this data link is kept permanently open. To keep the data link permanently open, it is also possible, by way of example, to send dummy data from the server 4 to the client 1 at regular intervals, particularly every 25-35 seconds, if no user data can be sent.

This allows the server 4 and the automation system 5 linked to the server 4 to send data to the client 1 at any time independently of the client 1. Following the response 12 from the server 4, the client 1 sends a new request 13 to the server 4. To this end, a new data link is set up. The server 4 again responds with a response 14 (=synchronous behavior). This data link is closed again after data transmission has been effected. If required, the client 1 sends, by way of example, a request 15 via the server 4, which is forwarded as a request 28 to the PLC 5. The PLC returns a response 29 to the server 4, which forwards it to the client 1 with a response 17 (=synchronous behavior). This data link is likewise closed again after data transmission has been effected.

Independently thereof and in parallel therewith, the server 4 can use the permanently open data link 12 to send the client 1 a message, e.g. a reaction to an event 30 in the PLC 5, without the client 1 having previously sent a request (=asynchronous callback 16). This would not be possible with a "normal" HTTP link. This asynchronous callback 16 is also possible between a request 15 and a response 17 which has not yet been given, particularly over time.

All in all, this results in user data communication 27 via the Internet in both directions, which can be initiated from both ends and can be effected at mutually independent times. This makes it possible for available communication channels on the Internet also to be used in a customary manner in the area of automation technology as an HMI (Human Machine Interface) interface for operating and observation purposes. One advantageous application which is suitable is the operating and observation system WinCC from the company Siemens, for example. The inventive system and method allow transmission of DCOM orders from the client 1 to the Internet server 4. The particular feature in this regard is that the method allows the Internet server 4 to send DCOM events to its client 1 without the latter having a "genuine" address, i.e. one which is visible on the Internet. The client 1 thus does not need to be visible on the Internet. It also does not need to have installed an Internet information server (IIS). No additional costs are therefore needed at the client end, since Internet browsers such as Internet Explorer from the company Microsoft or Netscape Communicator from the company Netscape, for example, are widely available. Data interchange between automation system and O&O user, for example for alarm purposes, thus does not require any specific special solutions.

In summary, the invention thus relates to a system and a method for transmitting data via data networks, particularly the Internet, particularly data for operating and observing an automation system 5. For a bidirectional user data link even behind firewalls via the Internet in both directions, even from a client 1 which is not visible as a server on the Internet, a method and a system are proposed in which a first data processing apparatus associated with a client 1, particularly an operating and observation system 1, is used to send a first connection request for setting up a first transmission channel 6a, 7a, 8a to an O&O server 4 in an automation system 5 via a data link 6, 7, 8, particularly an Internet link. A response thereto is sent using a second transmission channel 6b, 7b, 8b. A period of use without any time limitation is ensured for the data link 6, 7, 8 by virtue of the data link 6, 7, 8 being maintained by transmitting dummy data even in the absence of user data, for example, or by virtue of a client 1 being sent information which notifies the client 1 that transmission of user data is also intended. This results in a permanently open data link 6, 7, 8 which the O&O server 4 and hence the automation system 5 can use to send data to the client 1 and hence to the O&O system 1 asynchronously at any time and independently of actions by the client 1.

The invention claimed is:

1. A method for transmitting data via data networks, comprising:
    sending from a client a first connection request for setting up at least one first transmission channel to a server via at least one data link over at least one data network;
    maintaining the at least one data link permanently open for sending data from the server to the client via the at least one data network at any time independently of actions by the client by transmitting dummy data from the server to the client when no user data is transmitted, wherein the data link maintained by the server is used to transmit data up to a stipulated volume to the client, wherein said transmitting sends a request for a new connection to the client before the stipulated volume of data is reached; and
    sending from the client a new connection request for setting up at least one second transmission channel to the server in response to the request from the server for a new connection.

2. The method as claimed in claim 1, wherein said transmitting of the dummy data occurs every 25-35 seconds if no user data is transmitted.

3. The method as claimed in claim 1, wherein said transmitting sends the client information notifying the client that transmission of data is intended.

4. The method as claimed in claim 1, wherein the stipulated volume of data to be transmitted via the at least one first transmission channel is between 15 MB and 25 MB.

5. The method as claimed in claim 4, wherein said sending and transmitting are controlled by an Internet transport protocol.

6. The method as claimed in claim 5, wherein the Internet transport protocol provided is a hypertext transport protocol.

7. The method as claimed in claim 6, further comprising operating and observing an automation system via the at least one data network.

8. The method as claimed in claim 7, wherein the client is not visible on the Internet.

9. The method as claimed in claim 8, wherein the client has not installed an Internet information server.

10. The method as claimed in claim 7,
    further comprising communicating between the automation system and the server,
    wherein said sending is initiated by the client to establish the at least one first transmission channel as a distributed object, and wherein the server is a DCOM server providing a DCOM connection to the automation system.

11. A system for transmitting data via at least one data network, comprising:
at least one data processing client, which can be linked to the at least one data network, to set up at least one data link including a first transmission channel, and
a server, connectable to said at least one data processing client via the first transmission channel over the at least one data network, to maintain the at least one data link to the client permanently open for sending data from said server to said client via the at least one data network at any time independently of actions by said client by transmitting dummy data when no user data is transmitted, wherein said server sends information notifying said client that transmission of data is intended, to permanently maintain the at least one data link, wherein the first transmission channel may be used to transmit data up to a stipulated volume from said server to said client, and wherein said server sends a request for a new connection to the client before the stipulated volume of data is reached, to prompt said client to send a new connection request for setting up at least one second transmission channel to said server, for the purpose of permanently maintaining the at least one data link.

12. The system as claimed in claim 11, wherein control of data transmission uses an Internet transport protocol.

13. The system as claimed in claim 11, wherein the Internet transport protocol is a hypertext transport protocol.

14. The system as claimed in claim 11, wherein said client operates and observes an automation system with information and control communicated via the at least one data network.

15. The system as claimed in claim 14,
wherein said client initiates provision of the first transmission channel as a DCOM object, and
wherein said server is a DCOM server having a connection to the automation system.

16. The system as claimed in claim 14,
wherein said server is connected to the automation system, and
wherein said at least one data processing client performs diagnostics on the information from the automation system communicated via the at least one data network.

17. The method as claimed in claim 7,
further comprising sending operational data from the automation system to the server, and
wherein the data sent from the server to the client via the at least one data network includes the operational data of the automation system.

18. The method as claimed in claim 17, further comprising performing diagnostics at the client on the operational data of the automation system.

19. A method for transmitting data via data networks connected to computers, comprising:
sending, from a client behind data protection devices and not visible to all of the computers connected by the data networks, a first connection request for setting up at least one first transmission channel to a server via at least one data link over at least one data network;
operating and observing an automation system via the at least one data network;
maintaining the at least one data link permanently open for sending data from the server to the client via the at least one data network at any time independently of actions by the client by transmitting dummy data from the server to the client when no user data is transmitted, wherein the data link maintained by the server is used to transmit data up to a stipulated volume to the client, wherein said transmitting sends a request for a new connection to the client before the stipulated volume of data is reached; and
sending from the client a new connection request for setting up at least one second transmission channel to the server in response to the request from the server for a new connection.

* * * * *